United States Patent [19]

Bell

[11] 4,268,055
[45] May 19, 1981

[54] BICYCLE FORK ASSEMBLY

[76] Inventor: Theodore F. Bell, 400 Fentress Blvd., Daytona Beach, Fla. 32015

[21] Appl. No.: 948,330

[22] Filed: Oct. 4, 1978

Related U.S. Application Data

[62] Division of Ser. No. 664,238, Mar. 5, 1976, Pat. No. 4,129,317.

[51] Int. Cl.³ ............................................. B62K 15/00
[52] U.S. Cl. .................................. 280/278; 280/279; 280/281 R; 403/164
[58] Field of Search ................... 280/281 R, 279, 278, 280/152.1, 287

[56] References Cited

U.S. PATENT DOCUMENTS

| 458,806 | 9/1891 | Harriott | 280/152.1 |
|---|---|---|---|
| 680,816 | 8/1901 | Stevens | 280/152.1 |
| 2,236,127 | 3/1941 | Alexander | 280/279 |
| 2,333,642 | 11/1943 | Dempsey | 280/281 R |
| 2,595,075 | 4/1952 | Henderson | 280/281 R |
| 3,675,944 | 7/1972 | Kobayashi | 280/278 |
| 3,705,733 | 12/1972 | Koyama | 280/279 |
| 3,757,882 | 9/1973 | Honda | 280/278 |
| 4,079,958 | 3/1978 | Segawa | 280/279 |

FOREIGN PATENT DOCUMENTS

| 872372 | 6/1942 | France | 280/281 R |
|---|---|---|---|
| 912690 | 8/1946 | France | 280/279 |
| 972228 | 1/1951 | France | 280/281 R |
| 1192586 | 10/1959 | France | 280/281 R |
| 639709 | 7/1950 | United Kingdom | 280/281 R |

Primary Examiner—John P. Silverstrim
Attorney, Agent, or Firm—Barnes, Kisselle, Raisch & Choate

[57] ABSTRACT

A fork assembly for use in removably mounting a pair of bicycle fork tubes having longitudinally extending upper and lower brackets on a fork mounting tube of a bicycle frame comprising an inner tube rotatably mounted within the fork mounting tube and a rod extending through the inner tube. The brackets have rearwardly extending slots through which the rod passes to engage the fork assembly. A lower spool on the rod is adapted to engage the under side of the lower bracket and an upper spool on the rod is adapted to engage the under side of the upper bracket. The spools are movable longitudinally with the rod within the inner tube. Spring means within the inner tube yieldingly urges the spools into engagememt with the brackets. Locking means is provided on the upper end of the rod and is movable longitudinally of the rod such that when the locking means is moved longitudinally relative to the rod toward the upper surface of the upper bracket, the fork assembly is locked on the brackets, and when the locking means is moved longitudinally relative to the rod away from the upper bracket, the fork assembly can be removed by moving the rod and the spools longitudinally downwardly against the action of the spring means disengaging the spools from the brackets so that the fork assembly can be removed by transverse movement through the slots.

7 Claims, 8 Drawing Figures

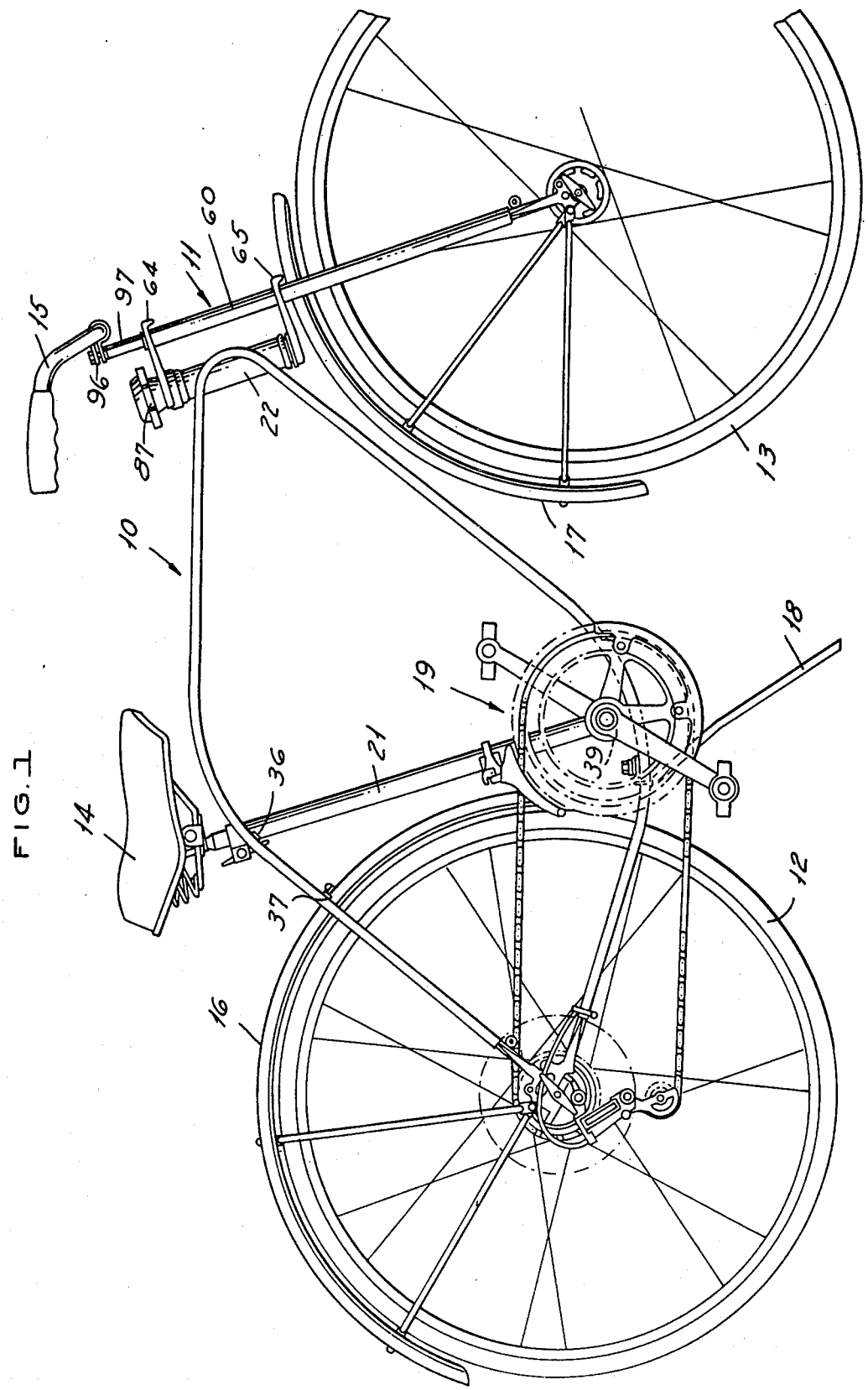

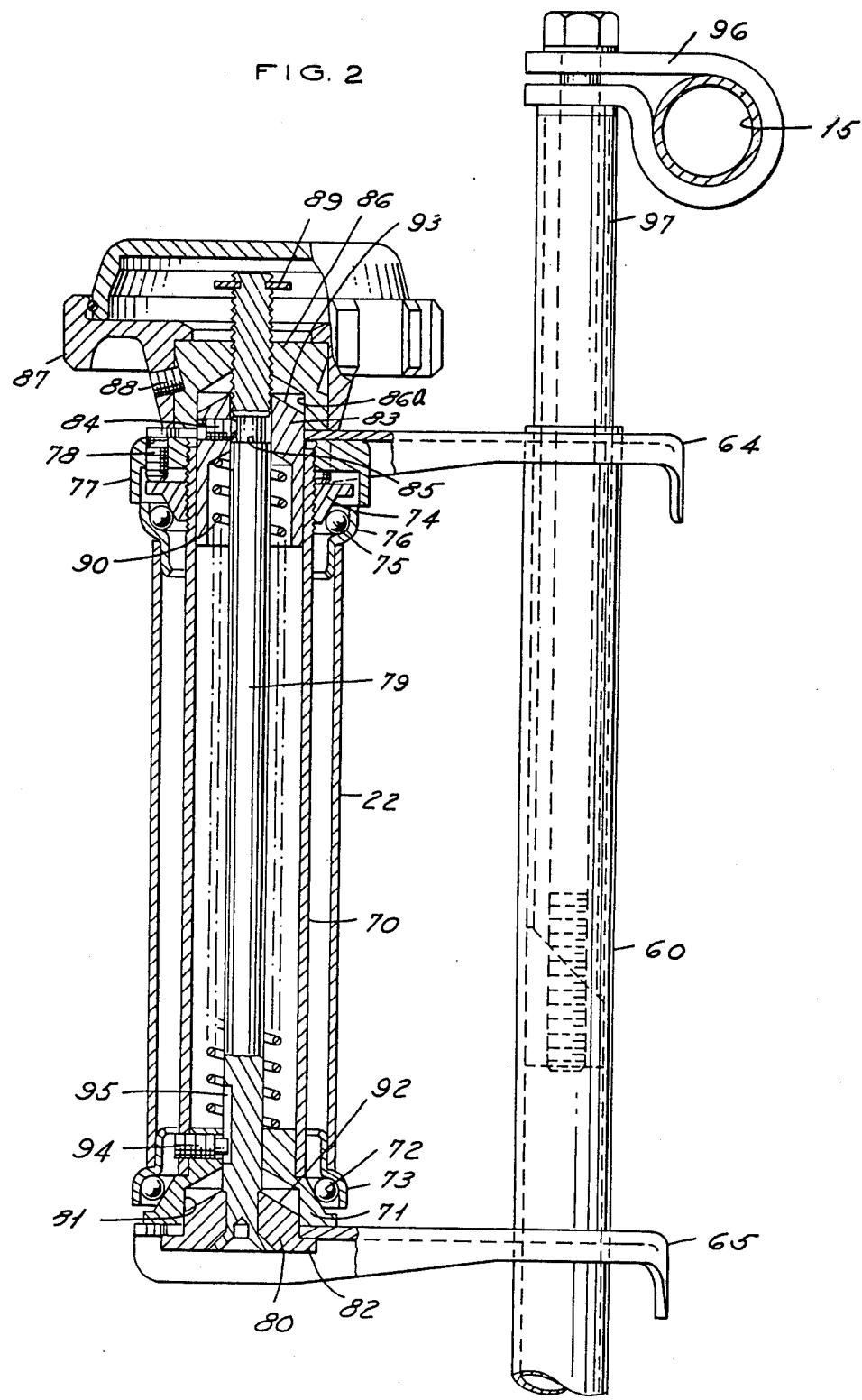

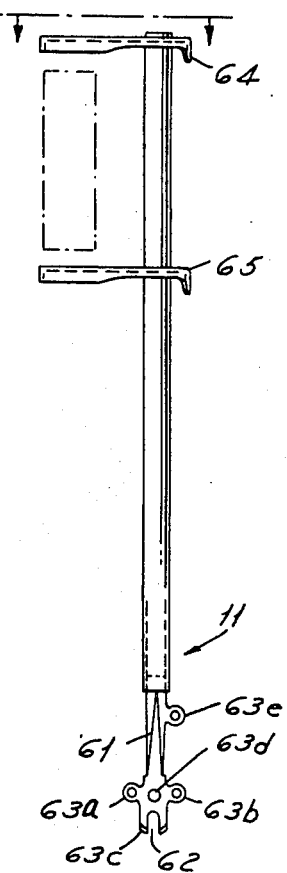
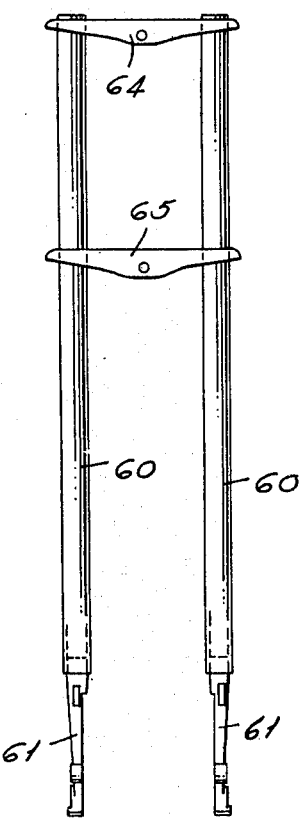
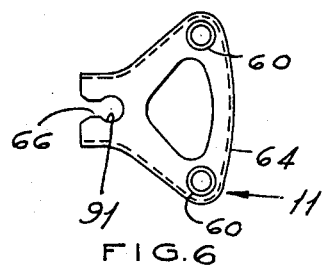
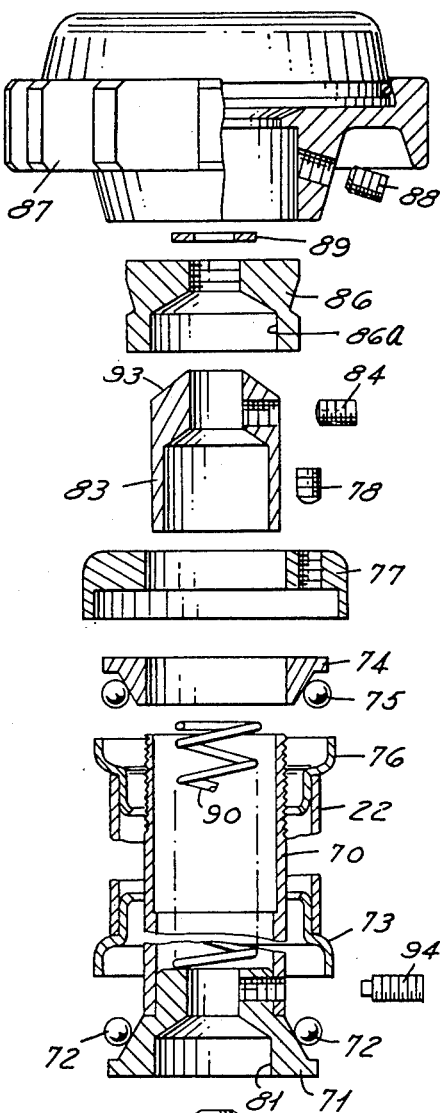
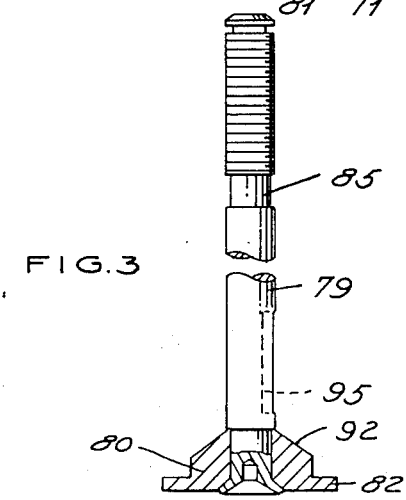

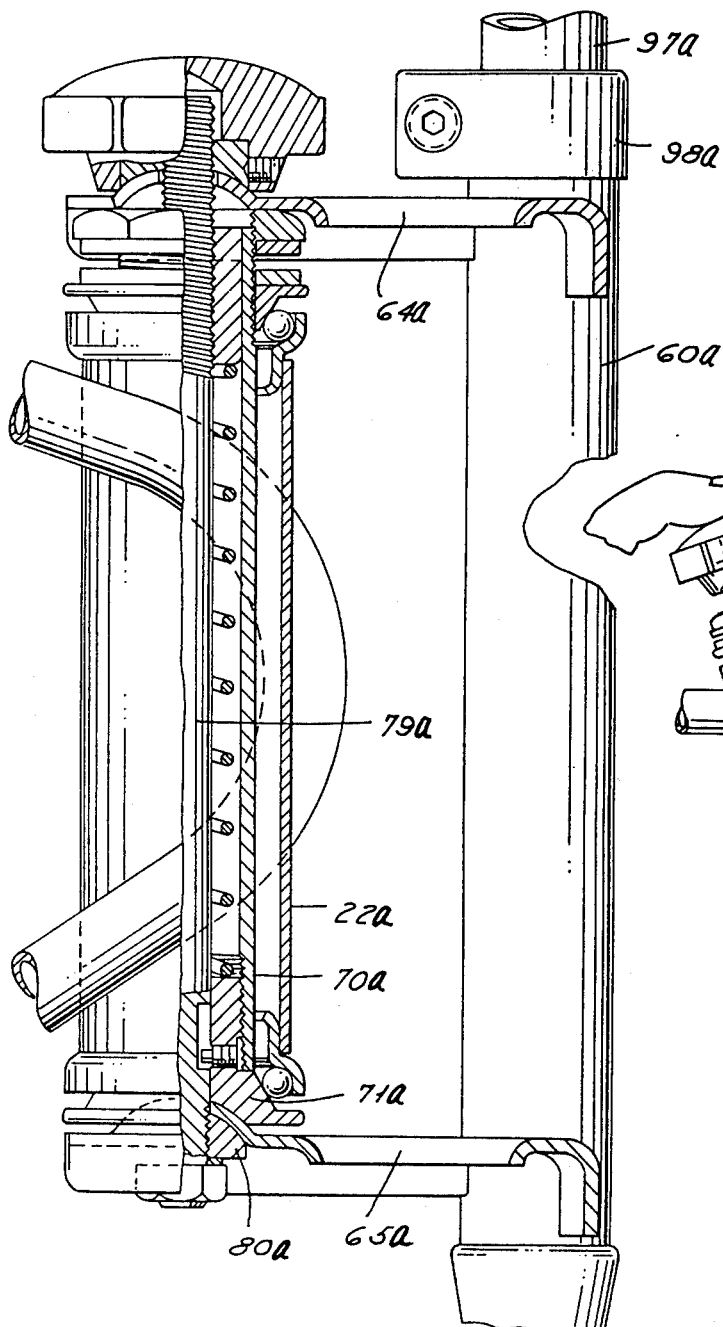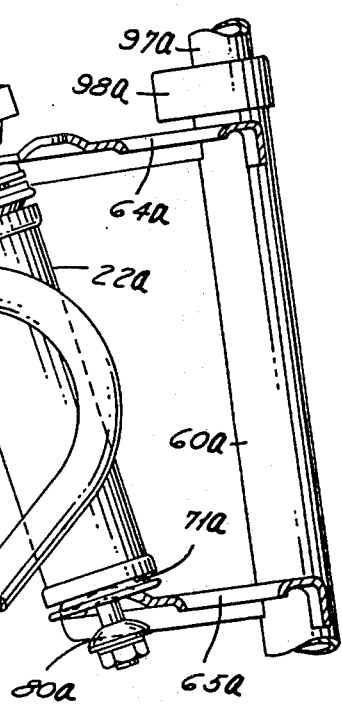
FIG. 7
FIG. 8

BICYCLE FORK ASSEMBLY

This is a division of application Ser. No. 664,238, filed Mar. 5, 1976, now U.S. Pat. No. 4,129,317.

This invention relates to bicycles.

BACKGROUND OF THE INVENTION

Among the objects of the invention are to provide a novel disconnectable or breakaway fork assembly.

SUMMARY OF THE INVENTION

In accordance with the invention, the fork assembly for use in removably mounting a pair of bicycle fork tubes having longitudinally extending upper and lower brackets on a fork mounting tube of a bicycle frame comprises an inner tube rotatably mounted within the fork mounting tube and a rod extending through the inner tube. The brackets have rearwardly extending slots through which the rod passes to engage the fork assembly. A lower spool on the rod is adapted to engage the under side of the lower bracket and an upper spool on the rod is adapted to engage the under side of the upper bracket. The spools are movable longitudinally with the rod within the inner tube. Spring means within the inner tube yieldingly urges the spools into engagement with the brackets. Locking means is provided on the upper end of the rod and is movable longitudinally of the rod such that when the locking means is moved longitudinally relative to the rod toward the upper surface of the upper bracket, the fork assembly is locked on the brackets, and when the locking means is moved longitudinally relative to the rod away from the upper bracket, the fork assembly can be removed by moving the rod and spools longitudinally downwardly against the action of the spring means disengaging the spools from the brackets so that the fork assembly can be removed by transverse movement through the slots.

DESCRIPTION OF THE DRAWINGS

FIG. 1 is a fragmentary side elevational view of a bicycle embodying the invention.

FIG. 2 is a vertical longitudinal sectional fragmentary view of the front fork mounting.

FIG. 3 is a fragmentary exploded view of a portion of the bicycle shown in FIG. 2.

FIG. 4 is a side elevational view of the fork.

FIG. 5 is a front elevational view of the fork.

FIG. 6 is a view taken along the line 6—6 in FIG. 4.

FIG. 7 is a vertical sectional view of a modified form of fork mounting.

FIG. 8 is a fragmentary view showing the manner of disconnecting the fork.

DESCRIPTION

Referring to FIG. 1, the bicycle comprises a frame 10 on which a fork assembly 11 is pivotally mounted. A wheel 12 is rotatably mounted on the frame 10 and a wheel 13 is rotatably mounted on the fork assembly 11. The bicycle includes a seat 14 mounted as presently described and handlebars 15 on the fork assembly 11, as presently described. The bicycle further includes fenders 16, 17 and a chain drive in accordance with conventional construction, the drive being shown as a multi-speed drive. A kickstand 18 is mounted on the frame 10.

Referring to FIGS. 2-5, the frame 10 comprises side frame members which are substantially identical mirror images of one another, a seat mast 21, and a fork mounting tube 22.

Referring to FIGS. 2-6, the front fork assembly 11 comprises spaced fork tubes 60 of substantially constant diameter having brackets 61 or dropouts telescoped therein and brazed thereto. Each bracket includes a slot 62 for receiving the front wheel axle as well as openings 63 for the mounting of accessories such as fenders, front wheel brake parts, and the like.

The fork assembly 11 further includes longitudinally spaced fork brackets 64, 65 having openings therein through which the tubes extend and to which the tubes are fixed as by brazing. The brackets 64, 65 extend rearwardly and are made of stampings as shown in FIG. 6 and include keyslots 66.

Dropout brackets 61 have openings 63a for fender brackets, 63b for front basket, 63c for safety stop-axle nut, 64d for safety clip retainer hole, and 63e for brake system.

The structure for removably mounting the fork on the tube is shown in FIGS. 2 and 3 and includes an inner tube 70 having a member 71 fixed on the lower end thereof and having a conical surface defining an inner race for receiving ball bearings 72, while the outer race is defined by a flange 73 on the fork mounting tube 22. The inner tube 70 further includes a nut 74 threaded on the upper end thereof and having a conical surface defining the inner race for ball bearings 75, while the outer race 76 is formed by a flange on the upper end of the fork mounting tube 22. A height adjusting nut 77 is also threaded on the upper end of the inner tube 70 and the position thereof axially is determined by an axial set screw 78 engaging the upper surface of the nut 74.

A fork rod 79 extends axially within the inner tube 70 and the fork mounting tube 22 and has a spool 80 on the lower end thereof which extends into an opening 81 in the member 71. Spool 80 has a flange 82 thereon which is adapted to engage the underside of the lower bracket 65 of the fork assembly, as presently described. A second spool 83 is provided on the upper end of the rod 79 and is held rotatably therein by a set screw 84 extending into an annular groove 85. The upper spool 83 telescopes within an opening 86a of a nut 86 threaded on the upper end of the rod. The nut is manipulated by a knob 87 locked to the nut 86 by a set screw 88. A C-shaped spring washer 89 in a groove on the upper end of the rod 79 limits the extent to which the knob 87 can be threaded upwardly on the rod 79. A helical spring 90 is interposed between the spool 83 and the member 71 and yieldingly urges the rod 79 upwardly.

When the knob 87 is threaded upwardly and a downward axial force is applied to the rod 79 against the action of the spring 90, a space is provided so that the slot 66 on the lower bracket 65 will permit the bracket to be inserted and assume a position between the member 71 and flange 82 of lower spool 80 on rod 79. The opening 91 of the keyslot 66 has substantially the same diameter as the spool 80.

Similarly, a space is provided upon depressing of the knob to permit the upper bracket 64 to be moved transversely of the rod 79 and permit the spool 83 to move through the opening 91 of the upper bracket 64.

The upper surfaces of the spools 80, 83 are inclined or tapered as at 92, 93 to facilitate the movement of the rod upwardly into the openings 91 of the brackets 64, 65. By tightening the knob 87, the fork is thereby locked in position. It may be noted that due to the presence of the spring 90 which urges the spools 80, 83 upwardly, the fork will remain in proper operative position on the bicycle even if the knob 87 is loose.

A set screw 94 is threaded transversely in inner tube 70 and has a reduced end extending into a groove 95 in fork rod 79 to limit the axial movement of rod 79 relative to tube 70.

In the form of the invention shown in FIGS. 7 and 8, the fork brackets 64a, 65a include deformed portions which are complementary to the bottom surface of the member 71a and the top surface of the spool 80a. In this form, the slots in the brackets are straight and not key-shaped. As in the previous form of the invention, by depressing the knob against the action of the spring, sufficient space is provided for insertion of the brackets (FIG. 8).

In each of the forms of fork assembly shown in FIGS. 2–8 inclusive, the handlebars 15 are mounted by brackets 96 on posts 97 that are telescoped within the tubes 60 and clamped by a clamp 98 in adjusted position.

I claim:

1. For use in removably mounting a pair of bicycle fork tubes having longitudinally extending upper and lower brackets on a fork mounting tube of a bicycle frame, a fork assembly comprising
    an inner tube,
    means for rotatably mounting the inner tube within the fork mounting tube,
    a rod extending through said inner tube,
    said brackets having rearwardly extending slots through which the rod may pass to engage the fork assembly,
    a lower spool on said rod adapted to engage the under side of said lower bracket,
    an upper spool on said rod adapted to engage the under side of said upper bracket,
    said spools being movable longitudinally with said rod within said inner tube,
    spring means within said inner tube yieldingly urging said spools into engagement with said brackets,
    and locking means on the upper end of said rod and movable longitudinally of said rod such that when said locking means is moved longitudinally relative to said rod toward the upper surface of said upper bracket, said fork assembly is locked on said brackets, and when said locking means is moved longitudinally relative to said rod away from said upper bracket, said fork assembly can be removed by moving said rod and said spools longitudinally downwardly against the action of said spring means disengaging said spools from said brackets so that said fork assembly can be removed by transverse movement through said slots.

2. The combination set forth in claim 1 wherein said locking means comprises a nut threaded on the upper end of said rod.

3. The combination set forth in claim 2 wherein said rod has means thereon preventing complete removal of said nut.

4. The combination set forth in claim 1 wherein said slot in each said fork bracket has a portion thereof deformed upwardly out of the plane of said bracket, said brackets and spools having complementary surfaces.

5. The combination set forth in claim 4 wherein said deformed portion has a concave surface and said spools have complementary convex surfaces.

6. The combination set forth in claim 1 wherein said spools on the upper and lower ends of said rod have inclined surfaces.

7. The combination set forth in claim 1 wherein said slot in each said fork bracket is key shaped.

* * * * *